United States Patent [19]

Gerth et al.

[11] Patent Number: 4,962,908
[45] Date of Patent: Oct. 16, 1990

[54] VARIABLE MOTOR SUPPORT

[75] Inventors: Wilfred B. Gerth, LaMirada; Eduardo R. Deocampo, Walnut, both of Calif.

[73] Assignee: Hydrotech Chemical Corporation, Marietta, Ga.

[21] Appl. No.: 280,572

[22] Filed: Dec. 6, 1988

[51] Int. Cl.⁵ .............................................. F16M 3/00
[52] U.S. Cl. ..................................... 248/674; 248/678
[58] Field of Search .............. 248/674, 673, 676, 677, 248/678, 637, 680, 500; 417/360, 423.15; 415/121

[56] References Cited

U.S. PATENT DOCUMENTS

| 1,474,604 | 11/1923 | Nielsen | 248/674 X |
| 4,155,528 | 5/1979 | Dawson | 248/674 |
| 4,188,008 | 2/1980 | Eagan, Sr. | 248/674 X |

Primary Examiner—Ramon O. Ramirez
Attorney, Agent, or Firm—Kirkland & Ellis

[57] ABSTRACT

There is provided a variable motor support for a pump comprising a pump foot member and a foot member insert, the pump foot member being suitably attached to, for example, the pump's volute housing and the foot member insert being cooperatively disposed with respect to the pump foot member, thereby accommodating differences in the physical dimensions of pump motors.

7 Claims, 4 Drawing Sheets

VARIABLE MOTOR SUPPORT

The present invention relates to variable supports and more specifically to variable motor supports.

BACKGROUND

Fluid pumps, particularly those used in the swimming pool and spa industry, typically include horizontally disposed electric motors for actuating the pumps. Such a motor is usually substantially cylindrical in form, having a drive shaft protruding from an end face of the cylinder. These motors are often cantilevered from the other pump components by suitable attachments to those end faces, however, additional support for the motor should often be provided.

In properly designing a fluid pump for a particular volumetric capacity, motor power is a convenient variable. By using motors of different sizes with a given set of other pump components, the pump's capacity can be efficiently tailored to each application. In the past, each such motor required a custom additional support, thus increasing the number of components needed to assemble a given pump. Further, pump motors of the same output power can have different physical dimensions. Such customized additional supports are often misplaced after a motor is selected and the pump installed.

Accordingly, it is an object of the present invention to provide a variable motor support to accommodate such differences in the physical dimensions of pump motors.

It is a further object of the present invention to provide a variable motor support which is less likely to be misplaced.

SUMMARY

In accordance with the present invention, a variable motor support for use in a pump having a volute housing and a motor comprises a pump foot member which is secured to, for example, the pump's volute housing, and a foot member insert which cooperates with the pump foot member and supports the pump's motor. In a preferred embodiment, the foot member insert is selectively disposed within a cavity in the pump foot member.

BRIEF DESCRIPTION OF THE DRAWINGS

The details and advantages of the invention will be understood from a reading of the following detailed description in conjunction with the drawings in which.

DETAILED DESCRIPTION

Figure 1:
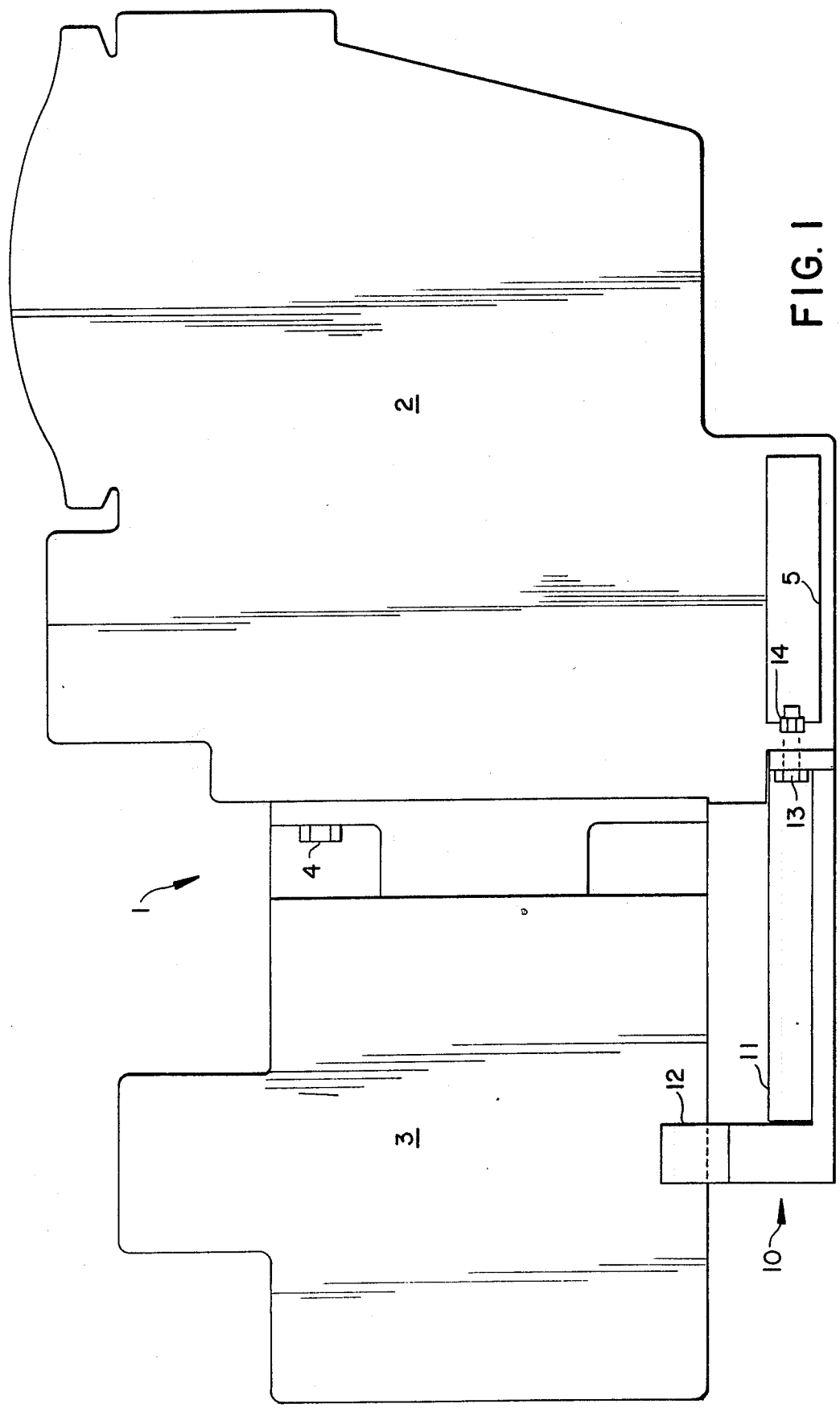
FIG. 1 shows a fluid pump and a variable motor support in accordance with the present invention.

Referring now to the Figures in which like parts are indicated by like reference numerals, FIG. 1 shows a view of a fluid pump and a variable pump support in accordance with the present invention. A typical pump is one such a that disclosed in commonly owned, co-pending U.S. patent application Ser. No. 07/266,849 for a Fluid Pump Having A Frusto-Conical Turbulence Reducer. The pump 1 generally comprises a volute housing 2 and a pump motor 3. The motor 3, which may be substantially cylindrical in cross-section, may be fastened at one end face to the volute housing 2 by a plurality of bolts 4, only one of which is indicated in the Figure. In many uses such as swimming pools, spas and the like, the volute housing 2 is placed on a concrete slab, block or other suitable foundation (not shown), and supported by a suitable foot portion 5 in the housing 2. The pump motor 3 is therefore usually disposed as a cantilever from the volute housing 2.

Adequate support of the pump motor 3 as a cantilever can be difficult to achieve. The weight of the motor 3 and the inevitable vibration produced by pump operation require the use of more and larger bolts and stronger, i.e., heavier, volute housing and pump. In accordance with the present invention, a variable motor support 10 is provided which alleviates the problems associated with a cantilevered pump motor and accommodates pump motors having different physical dimensions that can be employed with a given volute housing. The variable motor support 10 in a preferred embodiment comprises a pump foot member 11 and a foot member insert 12. The pump foot member 11 may be attached to the volute housing foot portion 5 by one or more suitable fasteners such as a bolt 13 and nut 14. As described in more detail below, the foot member insert 12 is advantageously adjustably disposed with respect to the pump foot member 11 to support pump motors having various physical dimensions.

Figure 2A:
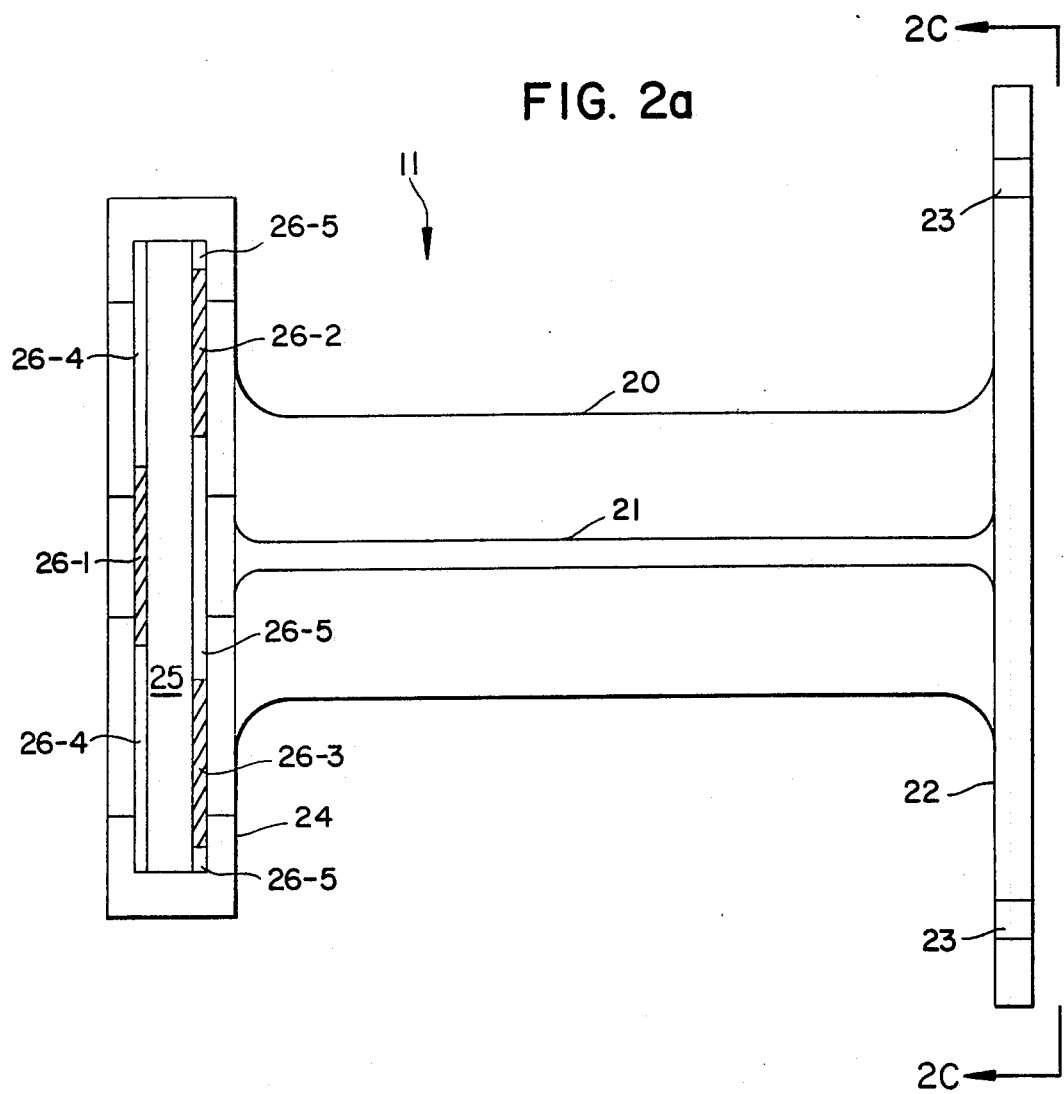
FIGS. 2a, 2b and 2c show orthogonal views of a pump foot member in accordance with the present invention.
Figure 2B:
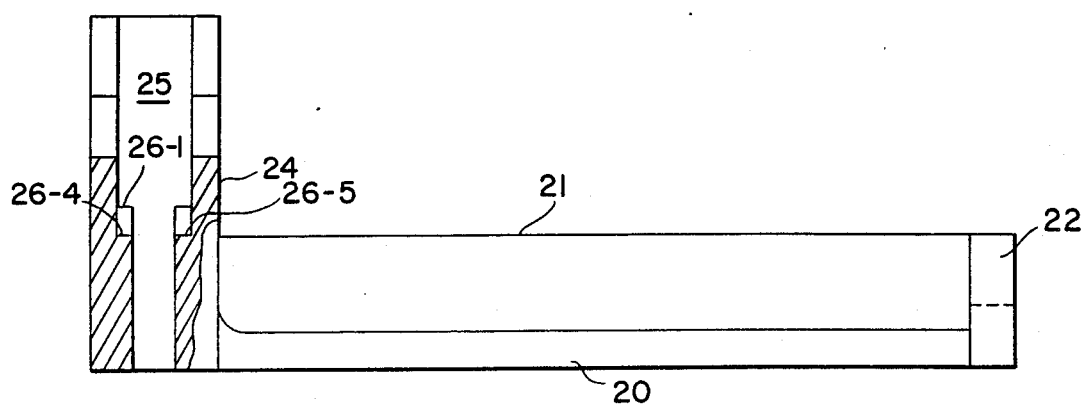
Figure 2C:
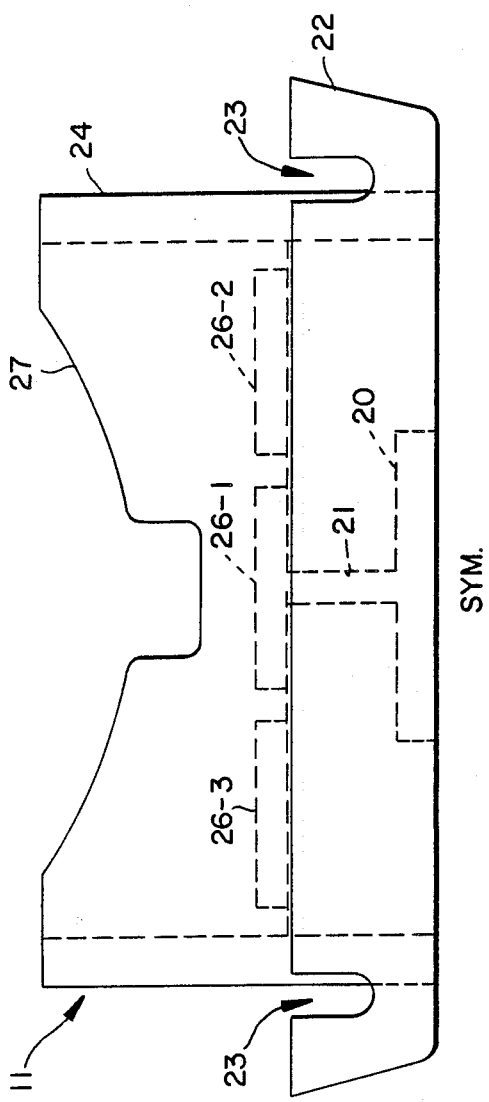
Figure 3A:
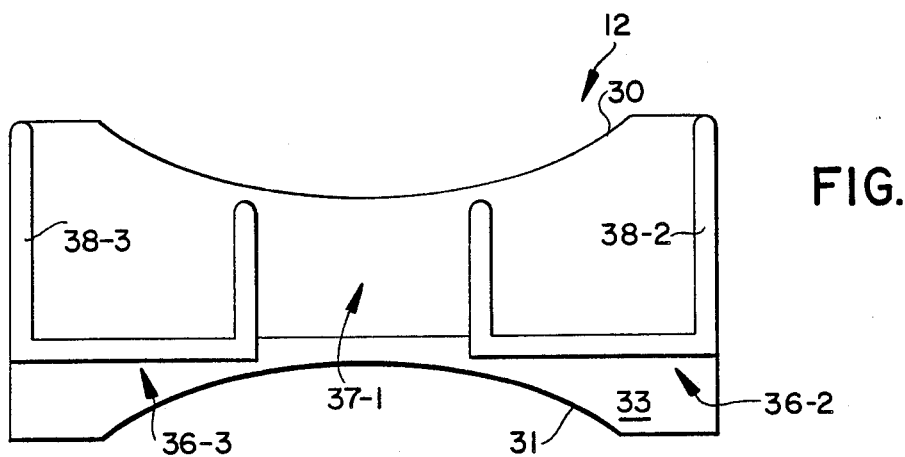
FIGS. 3a, 3b, 3c and 3d show orthogonal views of a foot member insert in accordance with the present invention.
Figure 3B:
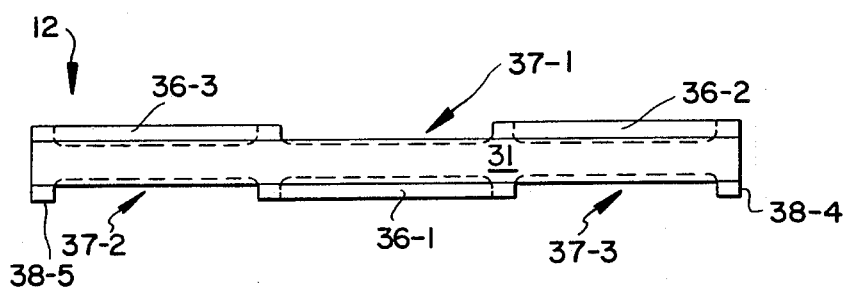
Figure 3C:
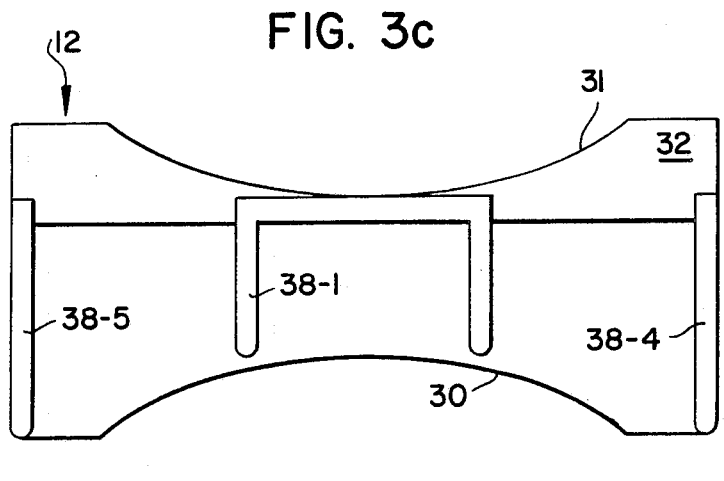
Figure 3D:
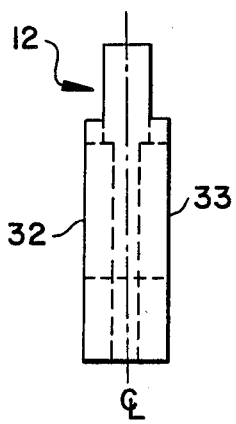

FIGS. 2a, 2b and 2c show orthogonal views of a preferred embodiment of the pump foot member 11. As shown from the top in FIG. 2a, the side in FIG. 2b and the front in FIG. 2c, the pump foot member 11 includes a base plate 20 which may include at least one strengthening rib 21. The rib 21 helps resist deformation of the pump foot member 11 while providing a lighter structure. An attachment plate 22 is disposed at the front end of the base plate 20 that abuts the foot portion 5 of the volute housing 2. The attachment plate 22 includes one or more passages 23, two being shown in this embodiment, within which the bolts 13 may be disposed.

As described further below, at least one insert plate 24 is disposed at the back end of the base plate 20 and includes a cavity 25 in which the correspondingly dimensioned foot member insert 12 is disposed. The surface of the cavity 25 includes a plurality of flat portions 26-1, 26-2, 26-3, 26-4 and 26-5.

As seen more clearly in FIG. 2c, the attachment plate 22 of the pump foot member 11 advantageously includes a means for adjusting the angle of the pump foot member 11 with respect to the volute housing 2. In a preferred embodiment, the angle adjusting means comprises the passages 23 taking the form of open slots. The pump foot member can thus be selectively rotated, for example, about its front-to-back centerline, thereby accommodating inclinations of the foundation on which the pump 1 is supported. It will be understood that in other embodiments of the angle adjusting means, the passages 23 may be closed slots, or circular holes that are oversized with respect to the bolts 13.

It may also be seen from FIG. 2c that the insert plate 24 is suitably shaped at its upper surface 27 to accommodate the shape of pump motor used with the present invention. In the embodiment illustrated such a pump shape would be cylindrically curved. As described in more detail below, the radius of curvature of the surface 27 and the height of the plate 24 are advantageously selected so that the pump foot member 11 can support a suitably dimensioned pump motor even without using a foot member insert 12. In addition, it will be appreciated that variation in these dimensions can be accommodated by the angle adjusting means.

Referring now to FIGS. 3a, 3b, 3c and 3d which show orthogonal views of a foot member insert 12 in accordance with the present invention, it will be seen that in a preferred embodiment the insert 12 generally comprises a shaped plate having opposed surfaces 30, 31 which are shaped to correspond to the physical dimensions of pump motors for use with the present invention. The insert 12 also has front 32 and back 33 surfaces which include flat portions 36-1, and 36-2 and 36-3, respectively. The physical dimensions of the insert 12 are suitably determined such that the insert 12 slidably cooperates with the cavity 25 and flat portions 26-1, 26-2, 26-3, 26-4 and 26-5 of the pump foot member.

It will be understood that the opposed surfaces 30, 31 are suitably shaped to correspond to the dimensions of pump motors used with a pump employing the invention. As illustrated, such motors may be cylindrically curved, and advantageously the radius of curvature of surface 30 may differ from the radius of curvature of surface 31. Furthermore, either or both of these radii may be different from the radius of curvature of surface 27. As described further below, either of the surfaces 30, 31 may be disposed at selected ones of predetermined heights above the base plate 20 of the pump foot member 11, thereby accommodating differences in dimensions between pump motors with only a single component.

A first height of the insert 12, thereby accommodating a pump motor having a first diameter, can be obtained by sliding the insert 12 into the cavity 25 in the foot member 11 with surfaces 30, 33 disposed toward the top and back, respectively, of the member 11. In this orientation, flat portion 26-1 in cavity 25 slides through a correspondingly dimensioned slot 37-1 formed by bosses 38-2, 38-3 on the surface 33. Similarly, flat portions 26-2, 26-3 slide through correspondingly dimensioned slots 37-2, 37-3, respectively, formed by bosses 38-1, 38-5, and 38-1, 38-4, respectively. Bosses 38-1, 38-2, 38-3, 38-4 and 38-5 advantageously locate the insert 12 in the correspondingly dimensioned cavity 25.

A second one of the predetermined heights of the insert 12, thereby accommodating a pump motor having a diameter different from the first's, can be obtained by sliding the insert 12 into the cavity 25 with surfaces 30, 32 disposed toward the top and back, respectively, of the pump foot member 11. In this orientation, the cavity's flat portion 26-1 engages the insert's flat portion 36-1, and, similarly, the cavity's flat portions 26-2, 26-3 engage the insert's flat portions 36-2, 36-3, respectively. Bosses 38-2, 38-3, 38-4 and 38-5 locate the insert 12 in the correspondingly dimensioned cavity.

A third predetermined height of the insert 12, thereby accommodating a pump motor having a yet different diameter, can be obtained by sliding the insert 12 into the cavity 25 with surfaces 31, 32 disposed toward the top and back, respectively, of the pump foot member 11. In this orientation, the insert 12 is supported in the cavity 25 by the bosses 38-4, 38-5 engaging flat portions 26-4, and bosses 38-2, 38-3 engaging flat portions 26-5. It will be understood that another insert height can be obtained by suitably dimensioning the bosses 38 and flat portions 26-4, 26-5 and disposing the insert 12 in the cavity 25 with the surfaces 31, 33 toward the top and back, respectively, of the pump foot member 11.

It will be appreciated that the insert heights obtained and motor dimensions accommodated are determined by the correspondingly dimensioned insert 11 and cavity 25, the dimensions of which can be readily calculated. Further, it will be understood that more than one insert and more than one cavity may be provided to obtain a greater selection of heights and dimensions, if desired, in accordance with the number of usable motors and/or volute housings. The additional cavities may be provided in the pump foot member 11 by, for example, suitably attaching thereto additional insert plates spaced conveniently from insert plate 24.

It will be understood that the above description and drawings are intended in all senses to be illustrative rather than restrictive. Those of ordinary skill in the art will recognize various modifications and alternative embodiments that fall within the spirit and scope of the invention that is to be limited solely by the appended claims.

What is claimed is:

1. In a pump having a volute housing and a motor, a variable motor support for accommodating differences in physical dimensions of a plurality of motors usable in the pump, comprising:
   a pump foot member adjustable attached to the volute housing and including a shaped cavity; and
   a foot member insert for engaging a surface of the shaped cavity and supporting the motor, the foot member insert being correspondingly dimensioned with respect to the shaped cavity and the physical dimensions of the plurality of motors.

2. The variable motor support of claim 1, wherein the surface of the shaped cavity and the foot member insert include a plurality of selectively engageable, correspondingly dimensioned flat portions for changing a height of the foot member insert with respect to the pump foot member in accordance with the flat portions selected for engagement.

3. The variable motor support of claim 1, wherein the pump foot member includes means for adjusting an angle of the pump foot member with respect to the volute housing.

4. The variable motor support of claim 1, wherein the pump foot member includes a plurality of shaped cavities, each shaped cavity being dimensioned in correspondence with a respective one of a plurality of foot member inserts.

5. In a pump having a volute housing and a motor, a variable motor support for accommodating differences in physical dimensions of a plurality of motors usable in the pump, comprising:
   a pump foot member, the pump foot member including means for attaching the pump foot member to the volute housing at a selected angle therebetween, a base plate, and an insert plate; and
   a foot member insert for supporting the motor in cooperation with the pump foot member, wherein a height of the foot member insert with respect to the pump foot member is selected by engaging selected surfaces of the insert plate and the foot member insert.

6. The variable motor support of claim 5, wherein the attaching means includes at least one slot, the insert plate includes a cavity having a plurality of flat surfaces formed therein, and the foot member insert includes another plurality of flat surfaces, the height of the foot member insert being selected by engaging selected ones of the pluralities of flat surfaces.

7. In a pump having a volute housing and a moor, a variable motor support for accommodating differences in physical dimensions of a plurality of motors usable in the pump, comprising:
- a pump foot member adjustably attached to the volute housing and including a plurality of shaped cavities; and
- a plurality of foot member inserts for engaging selected surfaces of the plurality of shaped cavities and supporting respective ones of the plurality of motors,
- wherein the surfaces of the pluralities of shaped cavities and foot member inserts include a plurality of selectively engageable, correspondingly dimensioned flat portions for changing a height of the foot member inserts with respect to the pump foot member in accordance with the flat portions selected for engagement.

* * * * *